United States Patent [19]

Bodner et al.

[11] 4,093,986

[45] June 6, 1978

[54] ADDRESS TRANSLATION WITH STORAGE PROTECTION

[75] Inventors: Ronald Eugene Bodner; Thomas Lee Crooks; Richard Craig Kiscaden, all of Rochester, Minn.

[73] Assignee: International Business Machines Corporation, Armonk, N.Y.

[21] Appl. No.: 754,392

[22] Filed: Dec. 27, 1976

[51] Int. Cl.² .................. G06F 13/00; G06F 9/20
[52] U.S. Cl. ..................................... 364/200
[58] Field of Search ....................... 364/200, 900

[56] References Cited

U.S. PATENT DOCUMENTS

| | | | |
|---|---|---|---|
| 3,528,062 | 9/1970 | Lehman | 364/200 |
| 3,530,438 | 9/1970 | Mellen | 364/200 |
| 3,839,706 | 10/1974 | Borchsenius | 364/200 |
| 3,909,798 | 9/1975 | Wallach | 364/200 |
| 3,938,096 | 2/1976 | Brown | 364/200 |
| 3,970,999 | 7/1976 | Elward | 364/200 |
| 4,017,839 | 4/1977 | Calle | 364/200 |

*Primary Examiner*—James D. Thomas
*Attorney, Agent, or Firm*—Donald F. Voss

[57] ABSTRACT

Storage protection is provided in a computer system having address translation by loading address translate registers with valid translated addresses and with special addresses. A circuit for generating a storage exception signal is connected to receive all addresses from the translate registers which are addressed by the main storage address and generates a storage exception signal in response to detecting a special address. The address translation mode is provided for both a main storage processor and a control processor with a separate address translate control register for each processor. Address translation is automatically selected based upon interrupt level. Address translation registers are also provided for I/O operations and are controlled independently from and can be in parallel with the task address translation registers.

12 Claims, 20 Drawing Figures

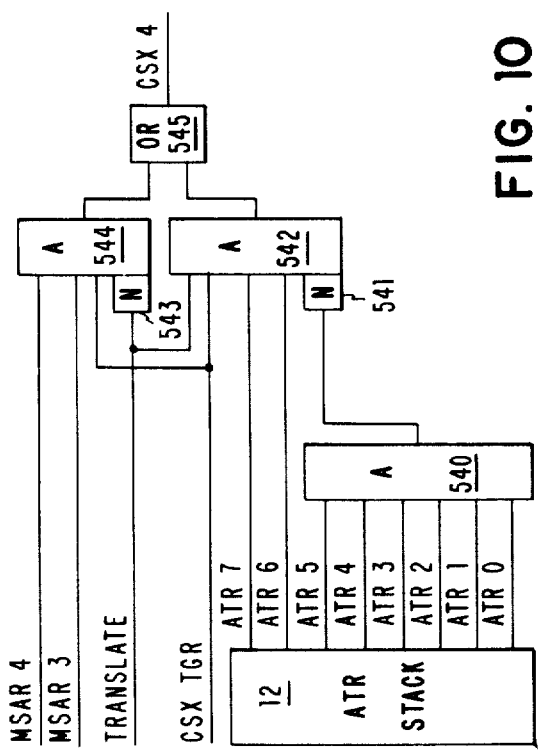
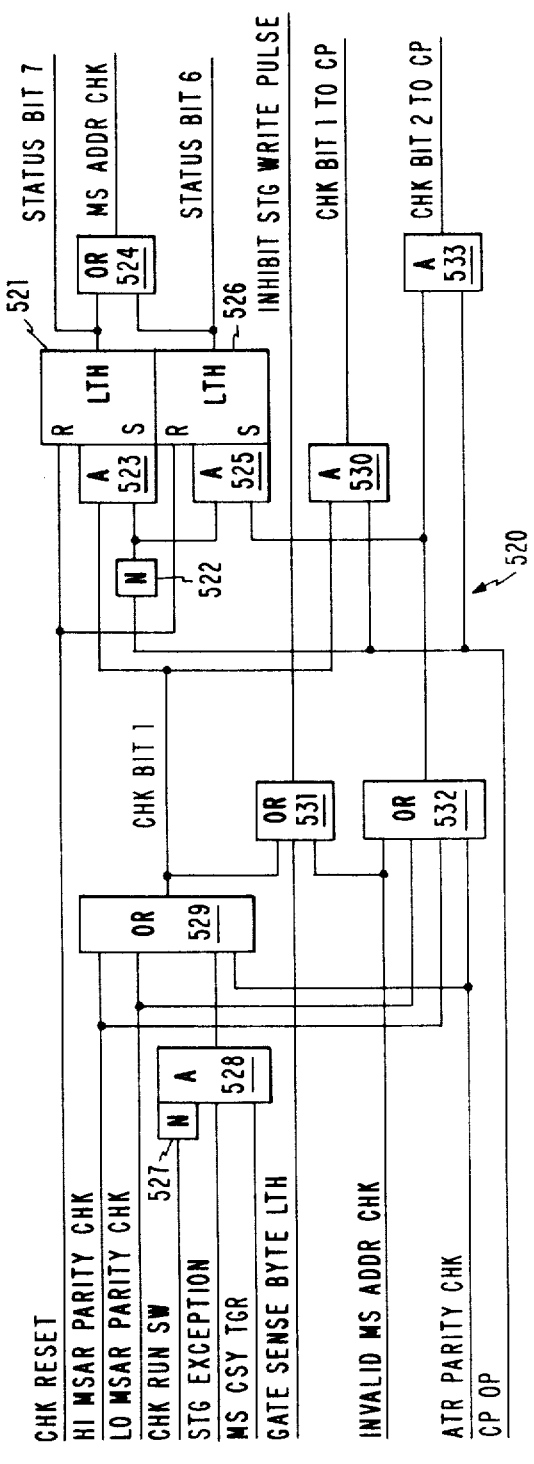
FIG. 10
FIG. 11

ADDRESS TRANSLATION WITH STORAGE PROTECTION

BACKGROUND OF THE INVENTION

1. Field of the Invention

This invention relates to computer systems and more particularly to computer systems having address translation with storage protection. The invention finds particular utility in computer systems where it is desirable to minimize the cost of the storage protection function and particularly where the programs in the computer system are independent of each other.

2. Prior Art

Heretofore it has been the practice to have discrete storage protection bits associated with a storage address to control the storage protection function. The storage protection bits were normally meaningful only when in the storage protection mode and could protect a storage location against being accessed for a read operation or written into for a write operation. The storage protection function could be independent of address translation. Prior art of this type is represented by U.S. Pat. No. 3,828,327. The present invention eliminates the need for having discrete storage protection bits associated with a storage address. Instead, the storage address is used to address a register which will contain either an address for allowing the storage operation to take place or an address which will generate a storage exception signal to inhibit the storage operation. Additionally, no boundary limits are required for the storage protection function as in U.S. Pat. Nos. 3,651,475, 3,742,458, and 3,827,029.

Also, in the past it has not been the practice to have separate address translation registers for CPU task operations and for I/O operations. For example, in U.S. Pat. No. 3,828,327 address translation was not provided for I/O operations. While address translation was available for both task and I/O operations in the computer system set forth on page 268 of the IBM Technical Disclosure Bulletin Vol. 19, No. 1, June 1976, only a single set of address translation registers were provided. Such an arrangement is more complex and could involve contention problems for the address translation registers between CPU tasks and I/O operations.

Also, in the past it has not been the practice to control the translate mode of operation based upon the current interrupt level or cycle steal. Also, it has not been the practice to have address translation control for a control processor independent of address translation control for a main storage processor.

SUMMARY OF THE INVENTION

The principal objects of the invention are to provide improved storage protection and address translation circuitry which:

(a) does not require discrete storage protection bits,
(b) has fixed storage protection in both address translate and non-translate modes,
(c) has automatic translation control based upon interrupt level or cycle steal,
(d) has address translation control for a control processor independent of and in parallel with address translation control for a main storage processor in an asymmetrical multiprocessor computer system, and
(e) eliminates contention for address translation registers between CPU task and I/O operations.

The foregoing objects are achieved by having a storage address also address a register which contains either an address for addressing storage or an address which will inhibit a storage operation. In a preferred embodiment only a portion of the storage address is used to address the register and the address in the register, if it enables a storage operation to take place, is concatenated with the remaining portion of the storage address.

When using a 16 bit logical address and five of the 16 bits are used to address the register containing an eight bit address portion to be concatenated with the remaining 11 bits of the logical address to form a real address, the maximum real address could address 512K positions of storage. However, by loading the register with hexidecimal FF as an address to effect storage protection by inhibiting a storage operation, only 510K positions of storage can be addressed. The last 2K of storage thus forms a boundary layer between the upper end of the beginning of addressable storage. The upper 2K positions of storage of course is unavailable for addressing because none of the combinations of the 11 bits of address concatenated with hexidecimal FF will result in a storage operation and 11 bits can address 2K positions of storage.

Separate address translation control registers enable address translation for a control processor to be independent of address translation for a main storage processor when incorporating the invention in a multiprocessor computer system.

Separate address translation registers for CPU task operations and I/O operations eliminate any contention which may otherwise arise if the address translation registers were shared between CPU and I/O operations.

BRIEF DESCRIPTION OF THE DRAWINGS

FIG. 8 is a logic diagram showing the details of that portion of the instruction function decode and control logic in FIG. 2f for generating controls signals for selecting and writing into the address translation registers of FIG. 2a;

FIG. 9 is a logic diagram illustrating the details of the storage protection circuit of FIG. 2a;

FIG. 10 is a logic diagram of that portion of the main store address decode circuit for inhibiting a main storage access of a protected storage location;

FIG. 11 is a logic diagram of the check circuit in FIG. 2a;

DESCRIPTION

Figure 1:
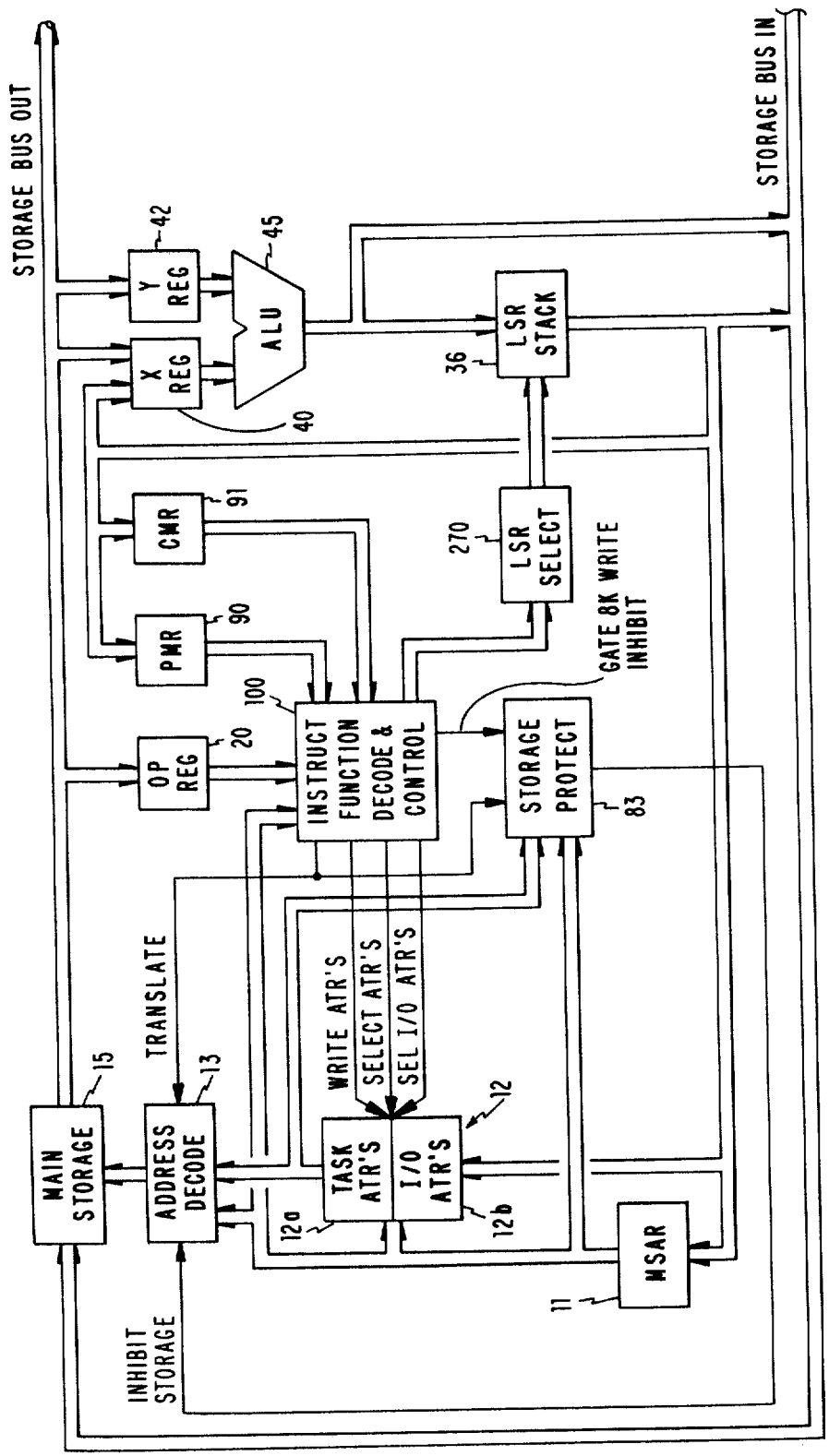
FIG. 1 is a block diagram of a computer system incorporating the invention.

With reference to the drawings and particularly to FIG. 1, the invention is illustrated by way of example as being incorporated into a computer system having main storage 15 which contains instructions and data. Main storage 15 is a conventional computer storage unit and is selectively addressable by addresses entered into the main storage address register MSAR 11. MSAR 11 is loaded with an address from a selected local storage register (LSR) 36. The local storage registers 36 are addressed under control of LSR select logic 270 which in turn receives signals from instruction function decode and control logic 100.

MSAR 11 in this particular instance contains 16 bits which are applied to address decode circuit 13. Additionally the high order bits 0-4 from MSAR 11 are applied to address translation registers 12. Whether or not an address translation register will be selected depends upon the presence of control signals from the instruction function decode and control logic 100.

Address translation registers 12 are eight bits wide. The eight bits from a selected address translation register are applied to address decode logic 13 and to storage protection circuit 83. If a translate signal is provided by the instruction function decode and control logic 100 to the address decode logic 13, the eight bits from the selected address translation register will be concatenated with the 11 low order bits from MSAR 11 to address main storage 15. Whether or not the storage operation takes place depends upon the state of the eight bits from the selected address translation register. If the eight bits from the selected address translation register are all ones the logic in the storage protect circuit 83 will generate an Inhibit Storage signal which is applied to address decode logic 13 to prevent a main storage operation.

Figures 3, 4, 5:
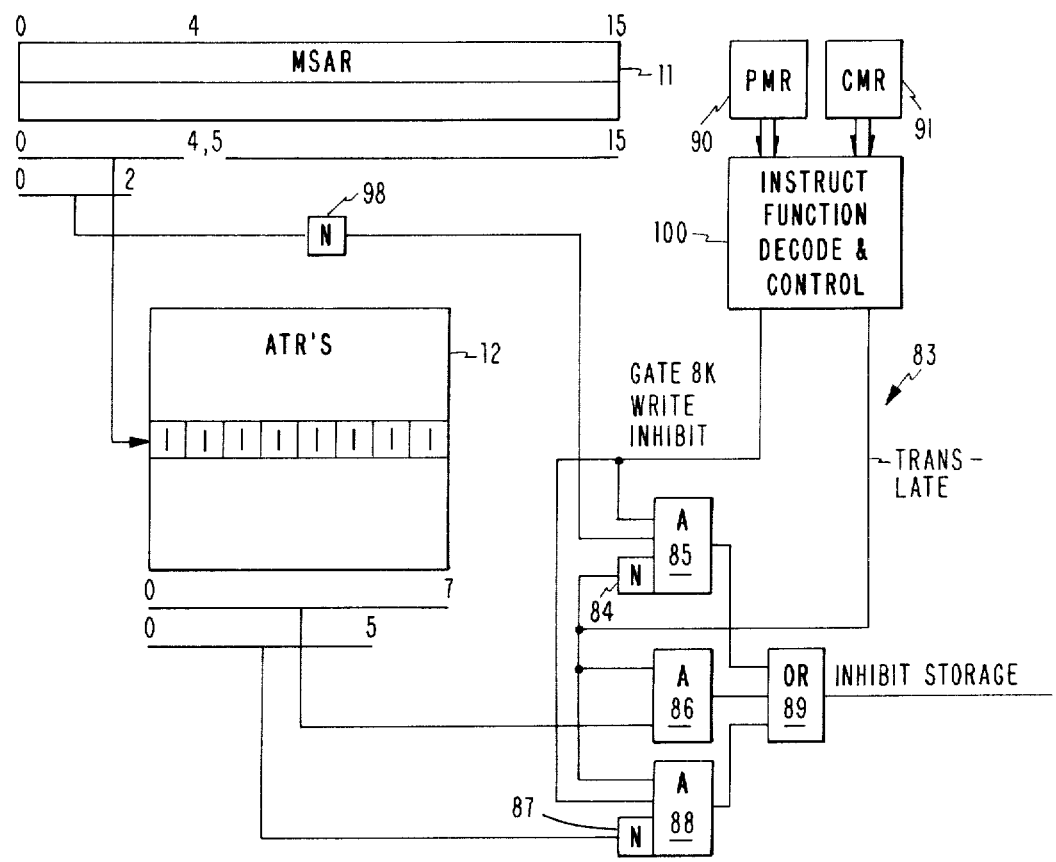
FIG. 3 is a diagram illustrating the program mode register.
FIG. 4 is a diagram illustrating the control mode register.
FIG. 5 is a diagram illustrating the logic of storage protection for both translate and non-translate modes in the computer system of FIG. 1.

The instruction function decode and control logic 100 in addition to having inputs from OP register 20, also receives inputs from program mode register 90 and control mode register 91. The bit positions of the program mode register 90 and the control mode register 91 are shown in FIGS. 3 and 4 respectively. Program mode register 90 is an eight bit register where bits 4, 5, and 6, when in the one state, indicate that the storage operation should take place in a translate mode. Bit 7, when in the one state, indicates that the first 8K of main storage 15 is protected against a storage write operation. Bits 0-3 inclusive are available for further control use but at this time are not being used. Control mode register 91 also has eight bits but only bits 6 and 7 are used. Bit 6, if in the one state, indicates that the I/O ATRs 12b should be selected rather than the task ATRs 12a. Bit 7 provides an address translation control bit for particular types of instructions. In the embodiment of FIG. 1 it would not be necessary to have both the program mode and the control mode registers because there is only one processor; however, the bits of both registers would still be retained but combined into one register.

The logic in the instruction function decode and control logic 100 responsive to the bits in the PMR 90 and CMR 91 for generating the translate signal, the select I/O ATR signal, the write ATR signal, the Gate 8K Write Inhibit signal and the select ATRs signal is substantially the same as that shown in FIG. 8 for the instruction function decode and control logic 100 of FIG. 2f which will be described in detail later herein.

The details of the storage protect circuit 83, FIG. 1, are shown in FIG. 5. AND circuit 86 is connected to receive bit inputs from the selected ATR 12 and the Translate signal from instruction function decode and control logic 100. Thus, if an ATR has a hexidecimal FF, i.e., all ones, and instruction function decode and control logic 100 is providing the Translate signal, the inputs to AND circuit 86 are satisfied and it provides an Inhibit Storage signal to OR circuit 89. The output of OR circuit 89 passes the Inhibit Storage signal to the address decode logic 13 to inhibit a storage operation.

AND circuits 85 and 88 function to provide an Inhibit Storage signal to OR circuit 89 when bit 7 of PMR 90 is a one and the address in MSAR 11 has a value which would be accessing a position within the first 8K of main storage 15. Thirteen bits can access up to 8K positions in storage. Thus, at least one of the MSAR bits 0-2 inclusive, when in the non-translate mode, must be a one or the inputs to AND circuit 85 will be satisfied and an Inhibit Storage signal will be generated. Inverter 84 provides a non-translate signal to AND circuit 85 and inverter 98 will provide an input to AND circuit 85 if MSAR bits 0-2 inclusive are all zeros.

AND circuit 88 functions to detect if any position within the first 8K of main storage 15 is being addressed when in the translate mode. AND circuit 88 receives the Translate signal and the Gate 8K Write Inhibit signal from instruction function decode and control logic 100 and an input from inverter 87. Inverter 87 is fed by bits 0-5 inclusive from ATRs 12. The bits from a selected ATR 12 are concatenated with MSAR bits 5-15 inclusive to address main storage 15. Thus, only ATR bits 0-5 inclusive are applied to inverter 87 whereby if these bits are all zero, the inputs to AND circuit 88 will be satisfied and the Inhibit Storage signal will be provided to OR circuit 89.

Figure 2A:
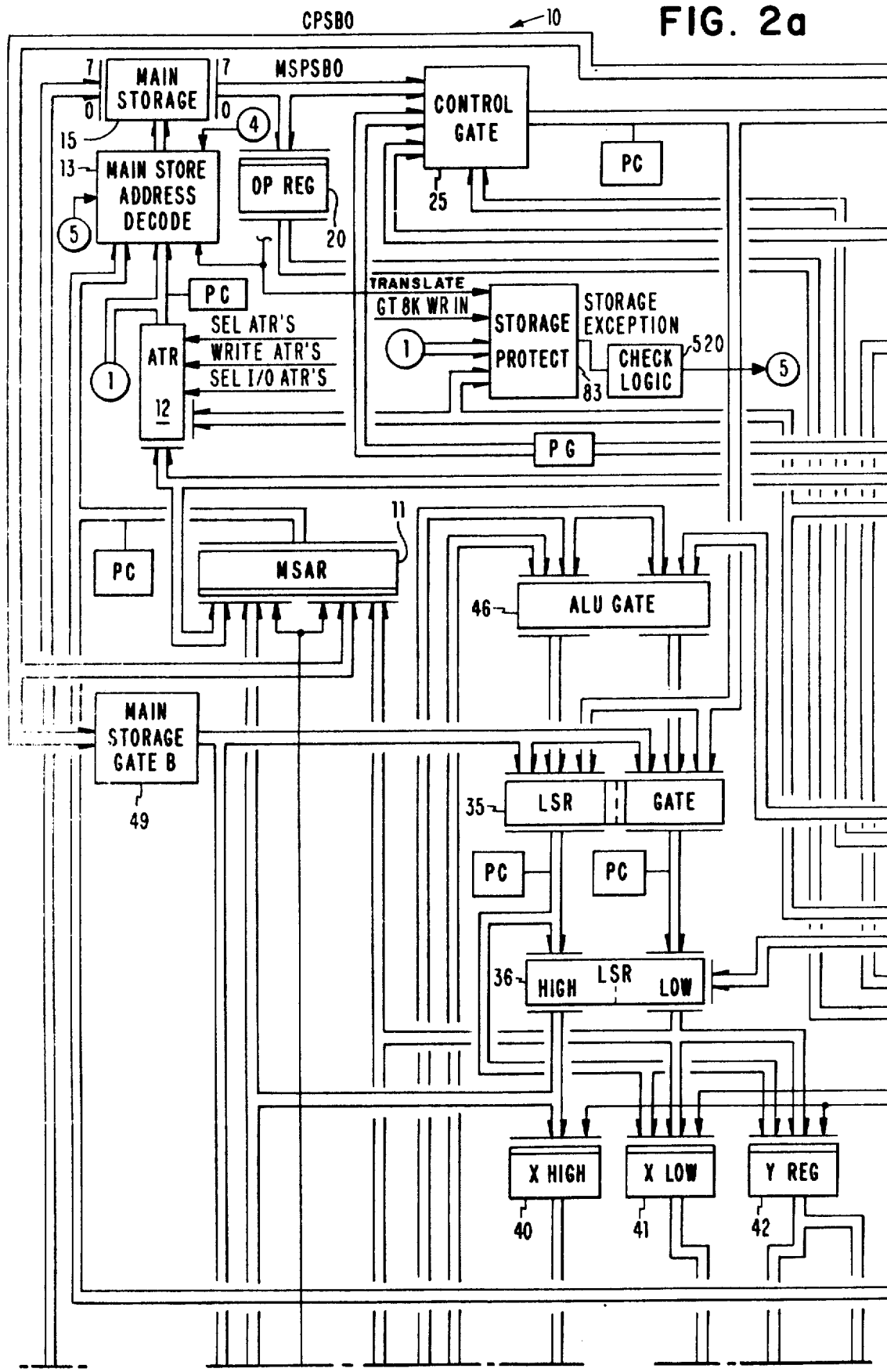
FIGS. 2a, 2b, 2c, 2d, 2e, and 2f taken together as in FIG. 2 represent a detailed block diagram of the invention as incorporated in a multiprocessor computer system.
Figure 2B:
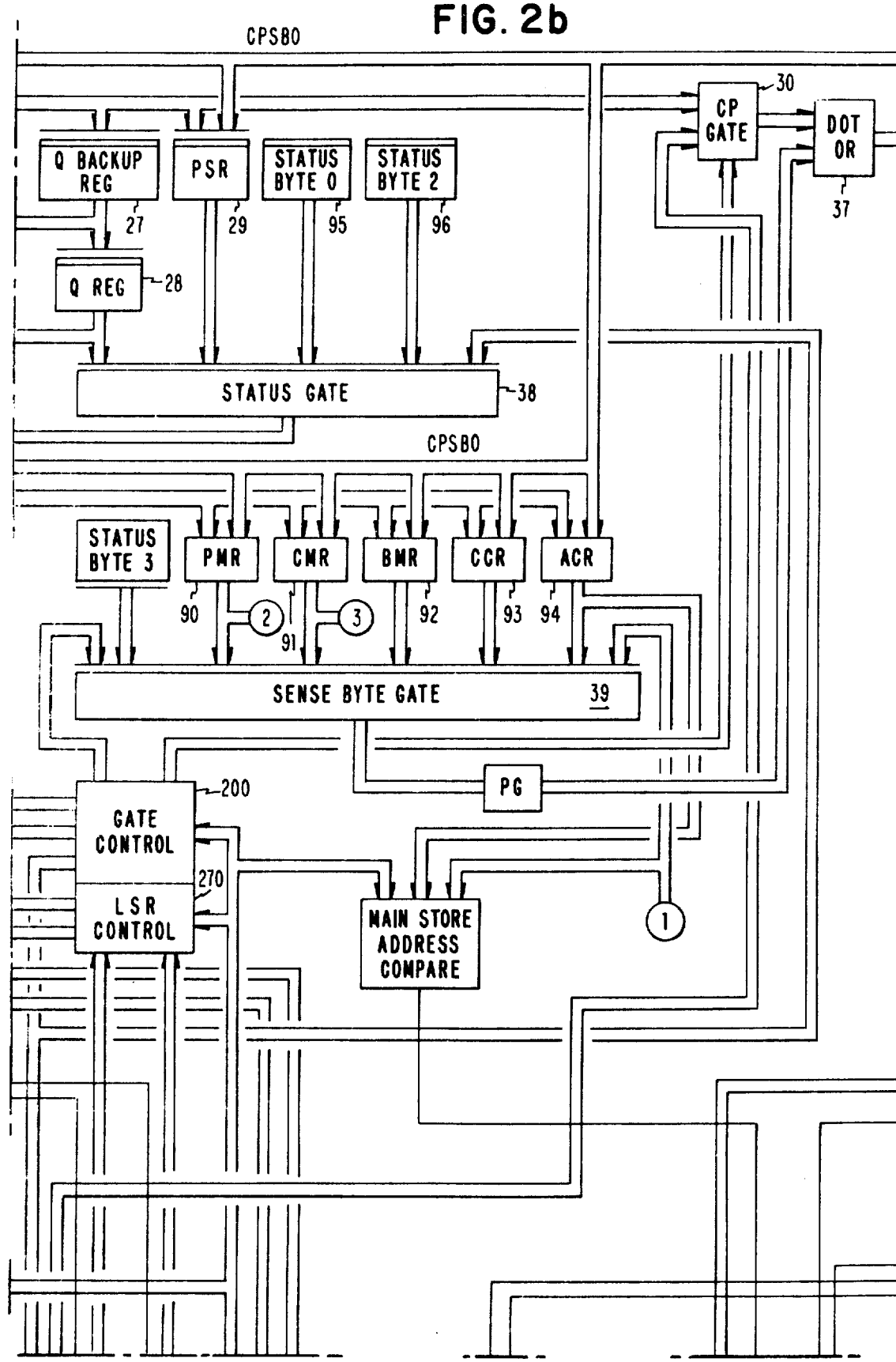
Figure 2C:
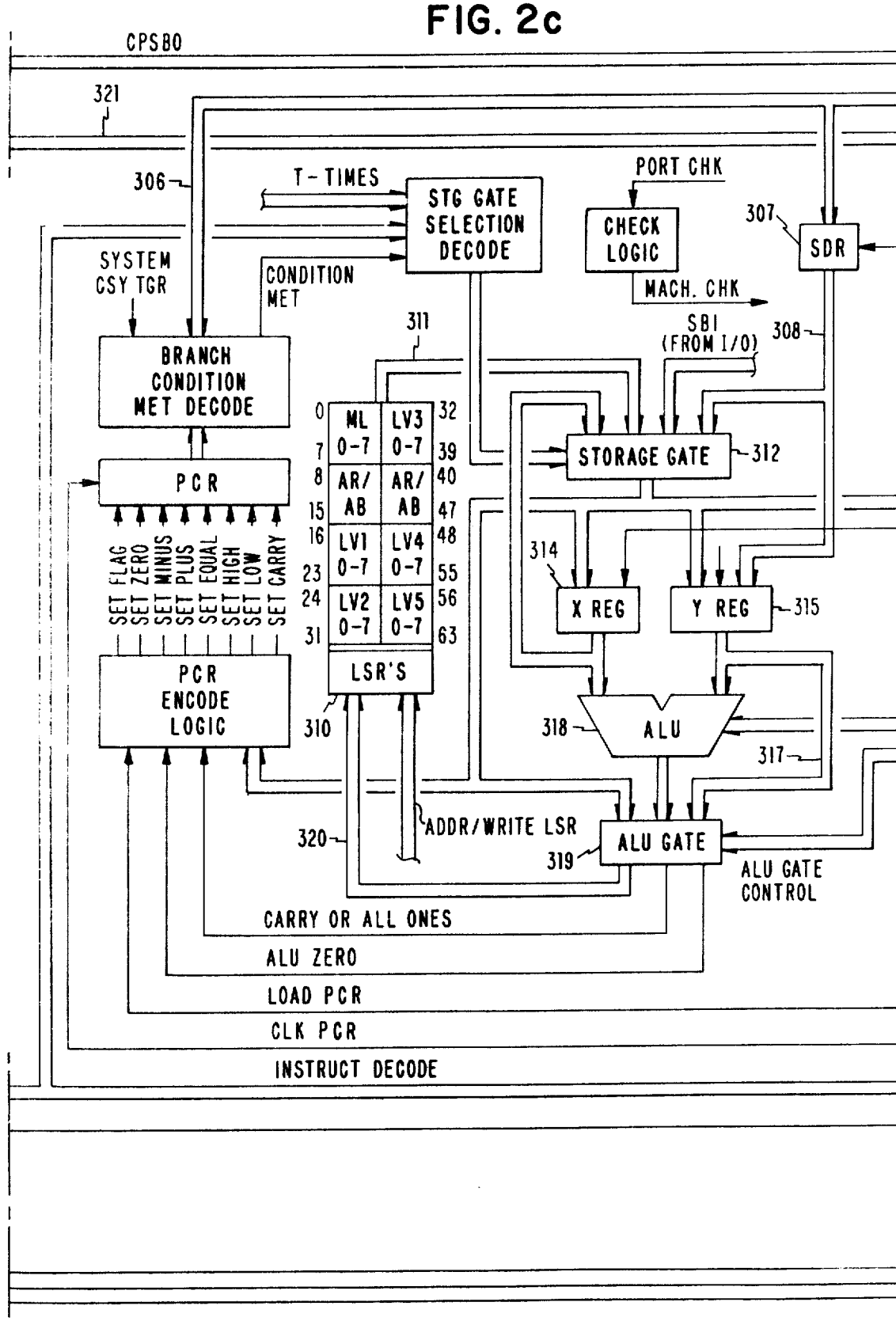
Figure 2D:
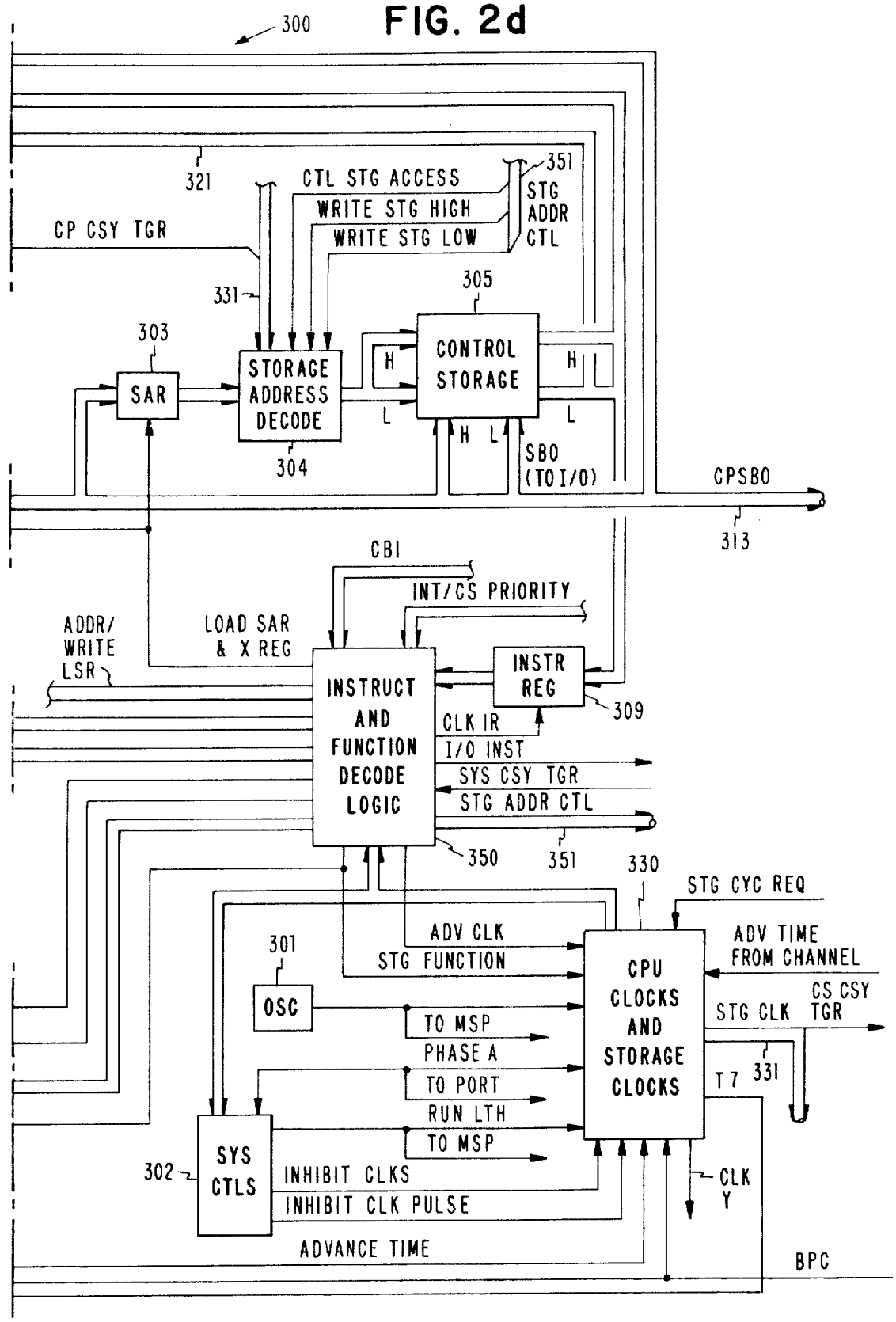
Figure 2E:
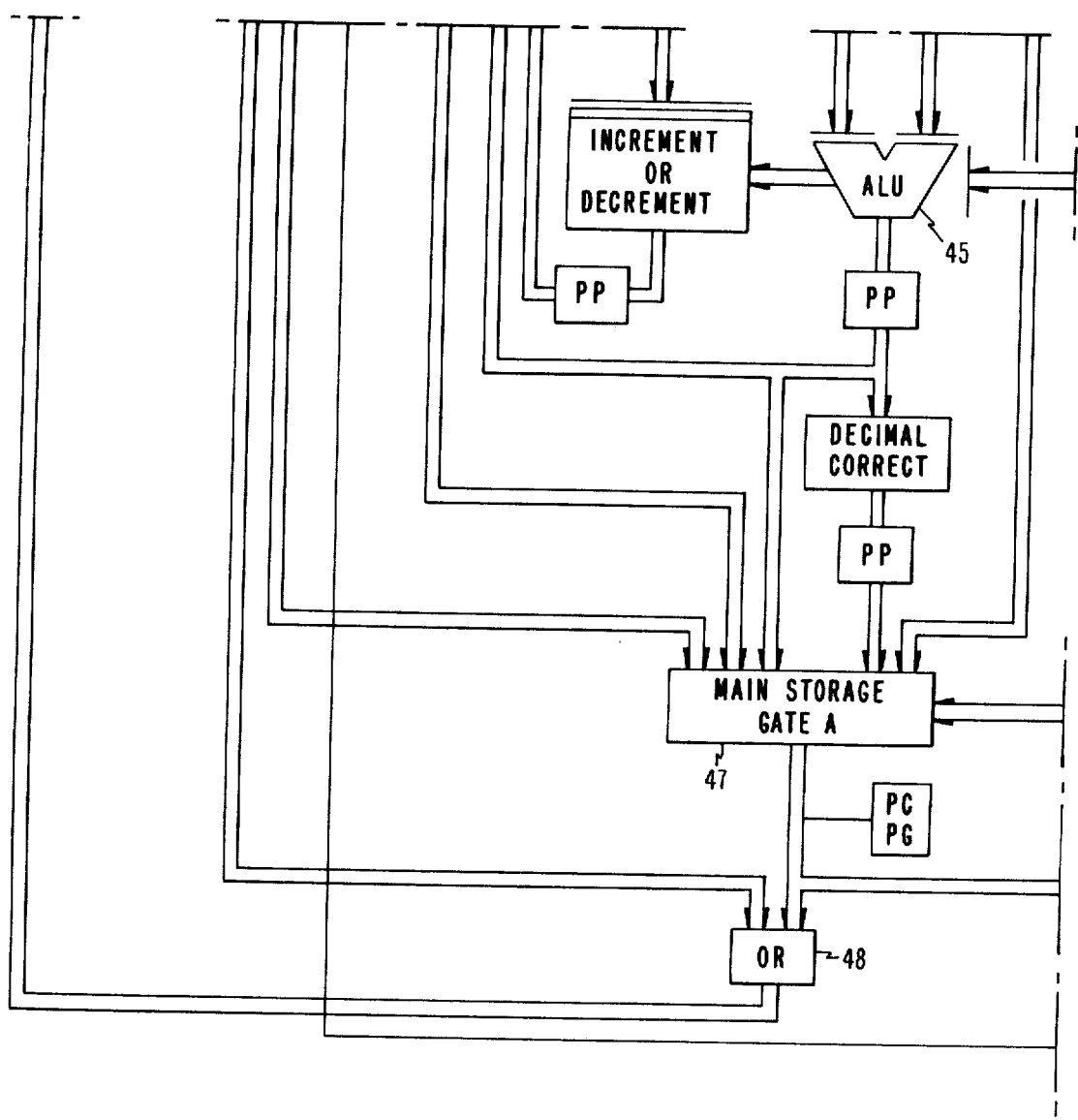
Figure 2F:
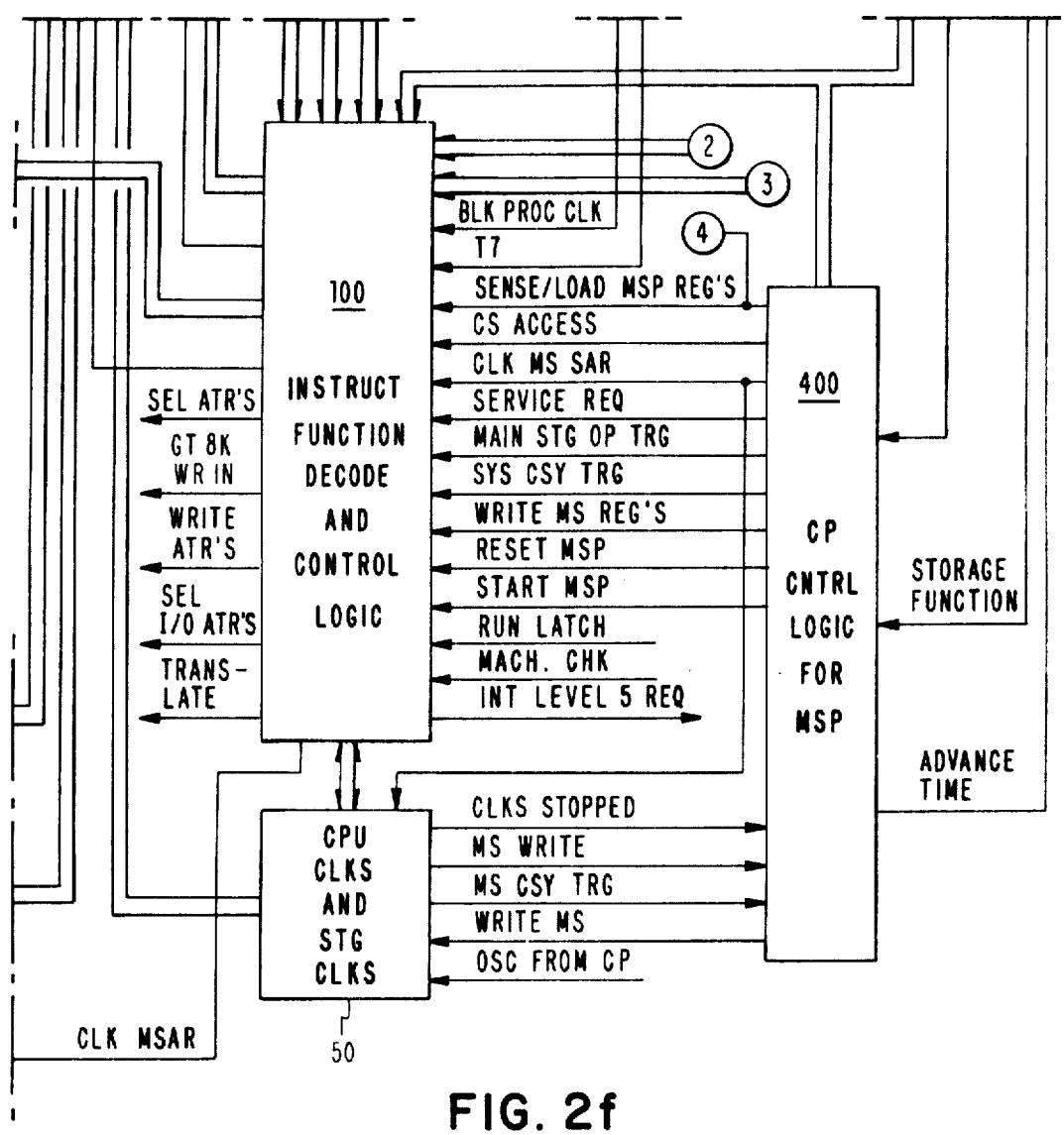
Figure 2:
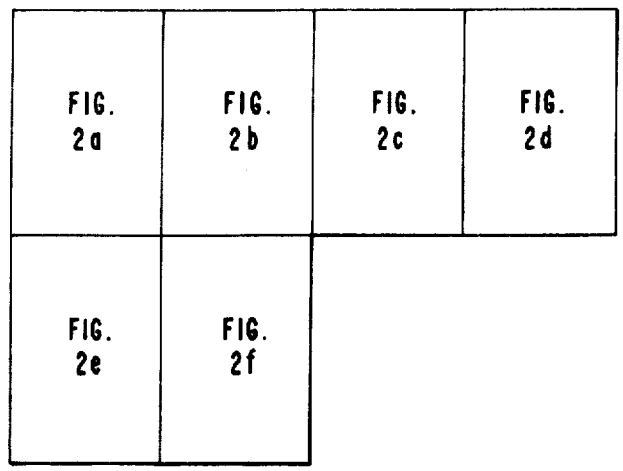
FIG. 2 is a diagram illustrating the arrangement of FIGS. 2a, 2b, 2c, 2d, 2e, and 2f.

The invention is applicable to computer systems which include only one processor, but it is also applicable to multiprocessor computer systems such as the computer system set forth in FIG. 2. Also, it should be noted that in the particular embodiments of FIGS. 1 and 2 the address translate registers are used for the storage protection function as well as the translate function. It should be realized that any register addressable by the main storage address register could be used to embody the invention. That addressable register of course could be loaded with either any storage address or with hexidecimal FF. Then when a storage operation is to take place, MSAR would provide its address to the storage address decode circuit and would also address that register. If that register contained hexidecimal FF, the storage operation would be inhibited.

The asymmetrical multiprocessor computer system of FIG. 2 is the subject of commonly assigned, copending application, Ser. No. 754,390 by R. Bodner, et al., for An Asymmetrical Multiprocessor Computer System. The multiprocessor computer system of FIG. 2 includes a main storage processor MSP 10 and a control processor CP 300. Wherever possible, elements of FIG. 2, which are similar to or substantially the same as elements in FIG. 1, will be referred to with like reference characters.

Figure 14:
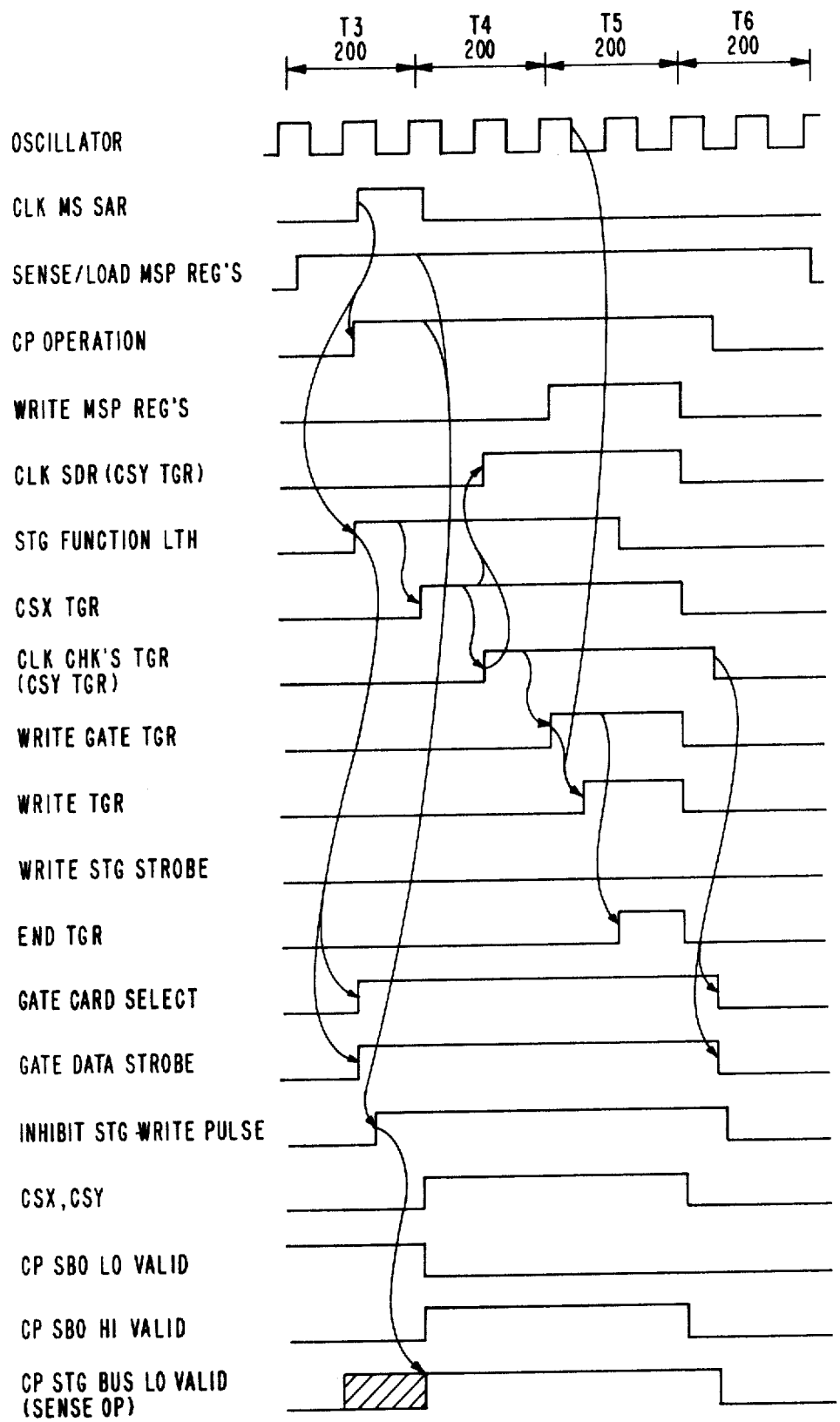

Main storage 15 in FIG. 2a can be accessed by either the MSP 10 or by CP 300. CP 300 can also access control storage 305, FIG. 2d, but there is no address translation or storage protection with respect to control storage 305. The address translation registers 12, FIG. 2a, are loaded and sensed under control of CP 300. CP 300 loads or senses data in address translation registers 12, program mode register 90, and control mode register 91 by executing a Sense/Load MSP REGs instruction retrieved from control storage 305, FIG. 2d. The particular manner in which data is loaded or sensed by the Sense/Load MSP REGs instruction is set forth in commonly assigned copending application, Ser. No. 754,373, by Bodner, et al for Instruction Processing Control Apparatus. The timing signals involved during execution of a Sense/Load MSP REGs instruction are shown in FIG. 14.

Figure 6:
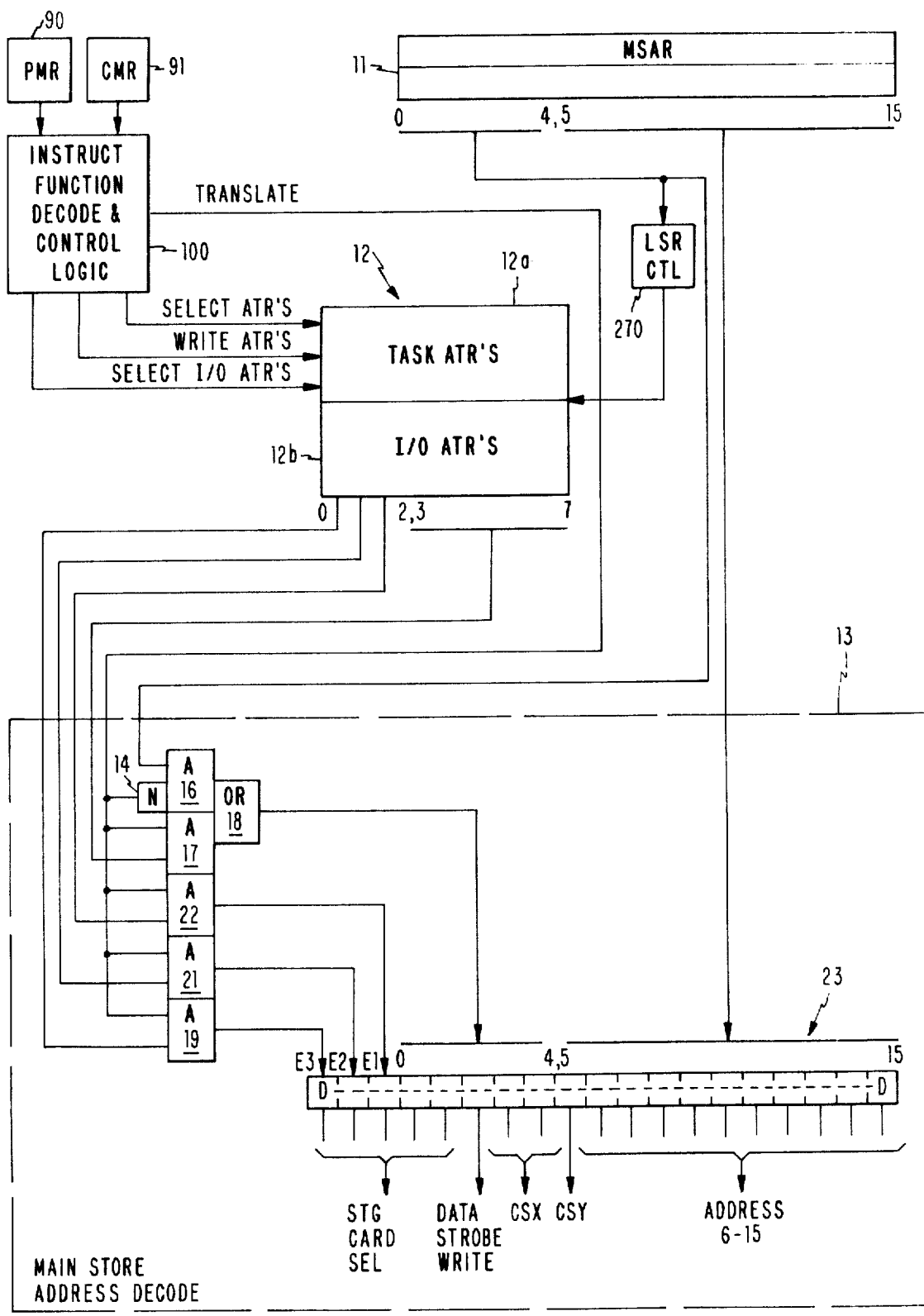
FIG. 6 is a diagram showing the logic in the main store address decode circuit of FIG. 2a for decoding storage addresses in both the translate and the non-translate modes.

The ATRs 12 in FIG. 2a are addressed by the high order bits 0-4 inclusive of MSAR 11. In order to be compatible with the embodiment of FIG. 2, bits 0-4 inclusive of MSAR 11 are shown in FIG. 6 as addressing ATRs 12 via LSR control 270. These MSAR bits 0-4 inclusive merely pass through LSR control 270 without any logic operation taking place and are applied directly to ATRs 12. Even though the MSAR bits 0-4 inclusive are applied to ATRs 12, it is necessary for instruction function decode and control logic 100 to provide signals for selecting the ATRs 12. Further, instruction function decode and control logic 100 provides a Select I/O ATRs signal if I/O ATRs 12b are to be selected instead of task ATRs 12a. Also, when the ATRs 12 are to be written into the instruction function decode and control logic 100 provides a Write ATRs signal.

The output of the ATRs 12 are applied to the main store address decode circuit 13 and to the storage protect circuit 83 of FIG. 2a and to the sense byte gate 39 of FIG. 2b. More specifically, ATR bits 3-7 inclusive are applied to AND circuit 17 of main store address decode logic 13, FIG. 6. AND circuit 17 also receives a Translate signal from instruction function decode and control logic 100 and feeds OR circuit 18. OR circuit 18 feeds drivers 0-4 inclusive of drivers 23. OR circuit 18 is also fed by AND circuit 16 which is connected to receive MSAR bits 0-4 inclusive and an input from inverter 14. Inverter 14 is fed by the Translate signal from instruction function decode and control logic 100. Thus when in the non-translate mode, AND circuit 16 passes MSAR bits 0-4 inclusive to drivers 0-4 inclusive of drivers 23 via OR circuit 18. ATR bits 0, 1, and 2 are applied to AND circuits 19, 21, and 22 respectively. These AND circuits are conditioned by the Translate signal from instruction function decode and control logic 100 and feed drivers E1, E2, and E3 of drivers 23. MSAR bits 5-15 inclusive feed drivers 5-15 inclusive of drivers 23. The outputs of drivers E1, E2, E3, and 0-15 inclusive are applied directly to main storage 15. Drivers E1, E2, E3, 0 and 1 are used for selecting storage cards of main storage 15. Driver 2 provides a Data Strobe signal. Drivers 3 and 4 provide CSX lines. Driver 5 provides a CSY line and drivers 6-15 inclusive provide address lines to the storage cards.

Figure 7:
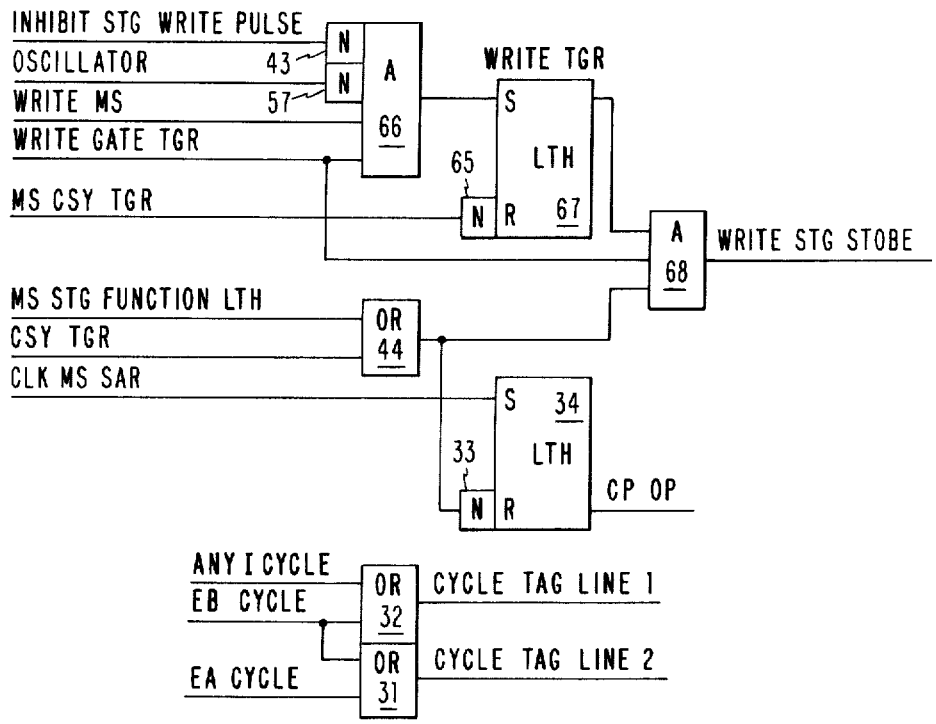
FIG. 7 is a diagram showing details of the CPU and storage clocks of FIG. 2f for producing a storage write pulse, a control processor operation signal and cycle tag lines.

The CPU clocks and storage clocks 50, FIG. 2f include circuitry for generating a Write Storage Strobe signal. The Write Storage Strobe signal from AND circuit 68, FIG. 7, will not be generated if check logic 520, FIGS. 2a and 11 provides an Inhibit Storage Write pulse. The Inhibit Storage Write pulse is fed to inverter 43, FIG. 7, and it feeds AND circuit 66. The output of AND circuit 66 is connected to set latch 67. Thus, latch 67 will not be set when check logic 520 provides the Inhibit Storage Write pulse. AND circuit 66 also receives the Write MS signal from CP control logic for MSP 400, FIG. 2f., a Write Gate TGR signal developed internally of CPU clocks and storage clocks 50 and an input from inverter 57 which receives an oscillator pulse from oscillator 301, FIG. 2d. Latch 67 is reset by an output from inverter 65. Inverter 65 is fed by the MS CSY TGR signal.

Latch 67 provides an input into AND circuit 68 which also receives the Write Gate TGR signal and an input from OR circuit 44. OR circuit 44 receives the MS STG Function LTH signal and the CSY TGR signal. OR circuit 44 also feeds inverter 33 which is connected to the reset input of latch 34. The set input of latch 34 is connected to receive the CLK MS SAR signal. The output of latch 34 is a CP OP signal indicative of a CP operation. OR circuits 31 and 32 provide Cycle Tag Line 1 and Cycle Tag Line 2 signals respectively. OR circuit 31 receives an Any I Cycle signal and an EB timing signal. OR circuit 32 receives the EA and EB timing signals.

Figure 8:
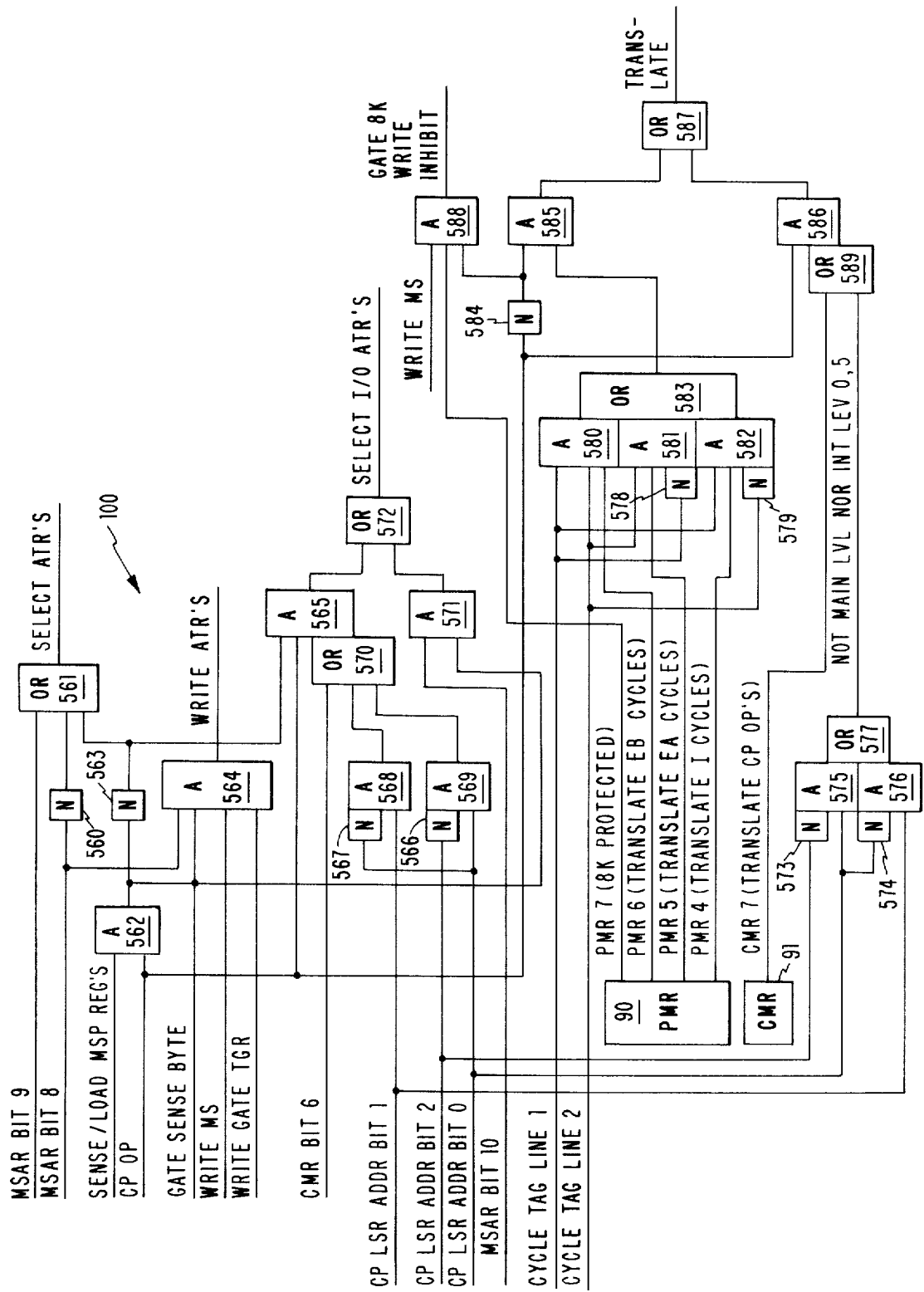

The CP OP signal from latch 34 and the Cycle Tag Line 1 and Cycle Tag Line 2 signals from OR circuits 31 and 32 are applied to circuitry in the instruction function decode and control logic 100 shown in FIG. 8. The CP OP signal is applied to AND circuits 562, 565 and 586 and to inverter 584. AND circuit 562 also receives the Sense/Load MSP REGs signal and it feeds inverter 563 and AND circuits 564 and 571. Inverter 563 feeds OR circuit 561 and AND circuit 565. The output of OR circuit 561 is the Select ATR signal. The Select ATR signal will be present during a MSP operation or during a CP OP when MSAR bit 9 is a one or if MSAR bit 8 is zero or the Sense/Load MSP REGs signal is not present. MSAR bit 9 feeds OR circuit 561 directly and MSAR bit 8 feeds OR circuit 561 via inverter 560.

The output of AND circuit 562 is a Gate Sense Byte signal and it provides an input to AND circuit 564 from which the Write ATR signal is taken. AND circuit 564 in addition to the input from AND circuit 562 also receives MSAR bit 8, the Write MS signal and the Write Gate TGR signal.

The Select I/O ATR signal is taken from OR circuit 572 which is fed by AND circuits 565 and 571. In addition to the CP OP input and the input from inverter 563, AND circuit 565 receives an input from OR circuit 570. OR circuit 570 is connected to receive CMR bit 6 and inputs from AND circuits 568 and 569. AND circuit 568 receives CP LSR Address Bit 1 directly, and CP LSR Address Bit 0 via inverter 567. The CP LSR Address Bit 0 also feeds AND circuit 569 which has an input from inverter 566. Inverter 566 is fed by the CP LSR Address Bit 2.

It will be recalled that the CMR bit 6, when in the one, state is indicative that the I/O ATRs 12b should be selected. The I/O ATRs 12b also are selected during a Sense/Load MSP REGs CP OP when MSAR bit 10 is a one. The CP OP signal is applied to AND circuit 562 together with the Sense/Load MSP REGs signal and the output of AND circuit 562 and MSAR bit 10 are applied to AND circuit 571 which feeds OR circuit 572.

The Translate signal is taken from OR circuit 587 and the Gate 8K Write Inhibit signal is taken from AND circuit 588. OR circuit 587 is fed by AND circuits 585 and 586. AND circuit 585 essentially develops the Translate signal based upon bit conditions in program mode register PMR 90 and AND circuit 586 develops the Translate signal based upon bit conditions in the control mode register CMR 91 or based upon the current interrupt level in CP 300. AND circuit 585 receives inputs from OR circuit 583 and inverter 584. OR circuit 583 is fed by AND circuits 580, 581, and 582 and inverter 584 is fed by the CP OP signal.

AND circuits 580 and 582 are conditioned by the Cycle Tag Line 1 signal and the Cycle Tag Line 2 signal conditions AND circuits 580 and 581. Additionally, AND circuit 580 is connected to receive PMR bit 6 which indicates that translation is to take place during EB cycles. AND circuit 581 receives PMR bit 5 which indicates that translation is to take during EA cycles. AND circuit 581 also receives an input from inverter 578 which is connected to receive the Cycle Tag Line 1 signal. Thus, AND circuit 581 provides an output during Cycle Tag Line 2 and not Cycle Tag Line 1 and PMR bit 5 is a one.

AND circuit 582 is connected to PMR bit 4 which indicates translation is to take place during I cycles. AND circuit 582 also has an input from inverter 579 which is connected to receive the Cycle Tag Line 2 signal. Thus, AND circuit 582 provides a Translate signal during Cycle Tag Line 1, and not during Cycle Tag Line 2 if PMR bit 4 is a one.

AND circuit 586 which provides the Translate signal during CP OPs also receives an input from OR circuit 589. OR circuit 589 is connected to receive the CMR bit 7 which controls translate operations during CP OPs for certain CP interrupt levels and a signal from OR circuit 577 which will be present when certain other CP interrupt levels are active. OR circuit 577 is fed by AND circuits 575 and 576. AND circuit 575 is connected to receive an input from inverter 573 and the CP LSR Address Bit 0. Inverter 573 is fed by the CP LSR Address Bit 2. AND circuit 576 is fed by inverter 574 and by the CP LSR Address Bit 1 signal. Inverter 574 is fed by the CP LSR Address Bit zero. The states of CP LSR Address Bits 0, 1 and 2 determine the active interrupt level and thus when either AND circuit 575 or 576 is satisfied a Translate signal is automatically generated during a CP OP.

AND circuit 588 which provides the Gate 8K Write Inhibit signal receives the Write MS signal, PMR bit 7 and the output of inverter 584. The first 8K of main storage is not protected against CP OPs because CP 300 has to have the ability to initialize main storage 15 or to change data therein.

Figure 9:
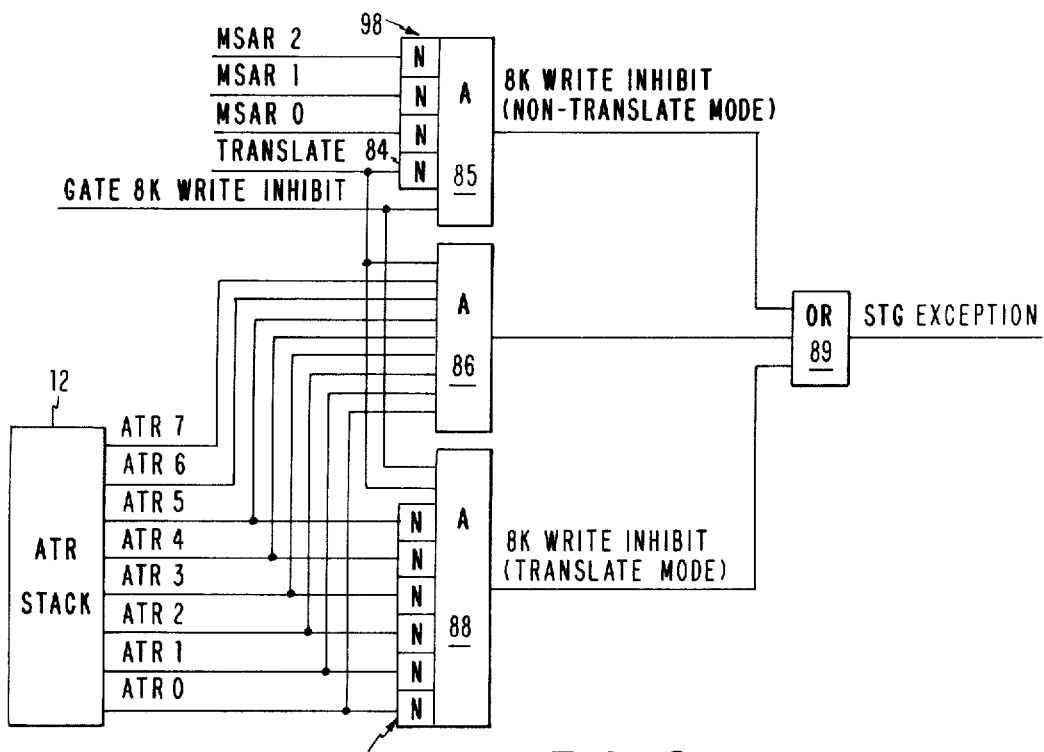

The storage protection circuit 83, FIG. 2a, as shown in detail in FIG. 9, is substantially the same as the storage protection circuit 83 in FIG. 5. The only difference is that the inverters 87 and 98 are shown individually for each bit input, i.e., there are six inverters 87 for receiving ATR bit inputs 0-5 inclusive and there are three inverter 98 for receiving MSAR bits 0-2 inclusive.

Although the STG Exception signal from OR circuit 89, FIG. 9, would perform substantially the same function as the Inhibit Storage signal from OR circuit 89, FIG. 5, the STG Exception signal is considered to inhibit writing into main storage. The reading or accessing of main storage is inhibited in the embodiment of FIG. 2 by preventing the development of the CSX 4 signal in main store address decode 13. When the CSX 4 signal is inhibited, FIG. 10, no storage addressing takes place. The CSX 4 signal is taken from OR circuit 545 which is fed by AND circuits 542 and 544. AND circuit 542 receives the CSX TGR signal, ATR bits 6 and 7, the Translate signal, and an input from inverter 541. Inverter 541 is fed by AND circuit 540 which receives ATR bits 0-5 inclusive. Thus, if all of the ATR bits 0-5 inclusive are one, AND circuit 542 is not satisfied while in the translate mode and the CSX 4 signal will not be developed. AND circuit 544 passes a CSX 4 signal to OR circuit 545 during the non-translate mode if MSAR bits 3 and 4 are ones. AND circuit 544 receives the CSX TGR signal, the non-translate signal from inverter 543, and MSAR bit inputs 3 and 4.

Check logic 520 is shown in FIG. 11. The STG Exception signal from OR circuit 89, FIG. 9 is applied to AND circuit 528, FIG. 11 together with the MS CSY signal and an input from inverter 527. Inverter 527 receives the Check Run Switch signal. AND circuit 528 feeds OR circuit 529 which has inputs from other check logic not pertinent to the present invention. The output of OR circuit 529 is a Check Bit One signal and so far as the present invention is concerned it generates the Inhibit STG Write pulse via OR circuit 531.

OR circuit 532 is pertinent to other check circuitry. This is also true with respect to AND circuit 533. AND circuit 530 receives the Check Bit One signal from OR circuit 529 and is conditioned by the CP OP signal. The output of AND circuit 530 provides a Check Bit one to CP 300. The Check Bit One signal is also applied to AND circuit 523 together with a signal from inverter 522. Inverter 522 receives the CP OP signal. The output of AND circuit 523 is connected to set latch 521. The output of latch 521 feeds OR circuit 524 to provide a MS Address Check signal. The inverter 522 also feeds an AND circuit 525, together with the Check Bit One signal. AND circuit 525 is connected to set latch 526 which feeds OR circuit 524.

Figure 12:
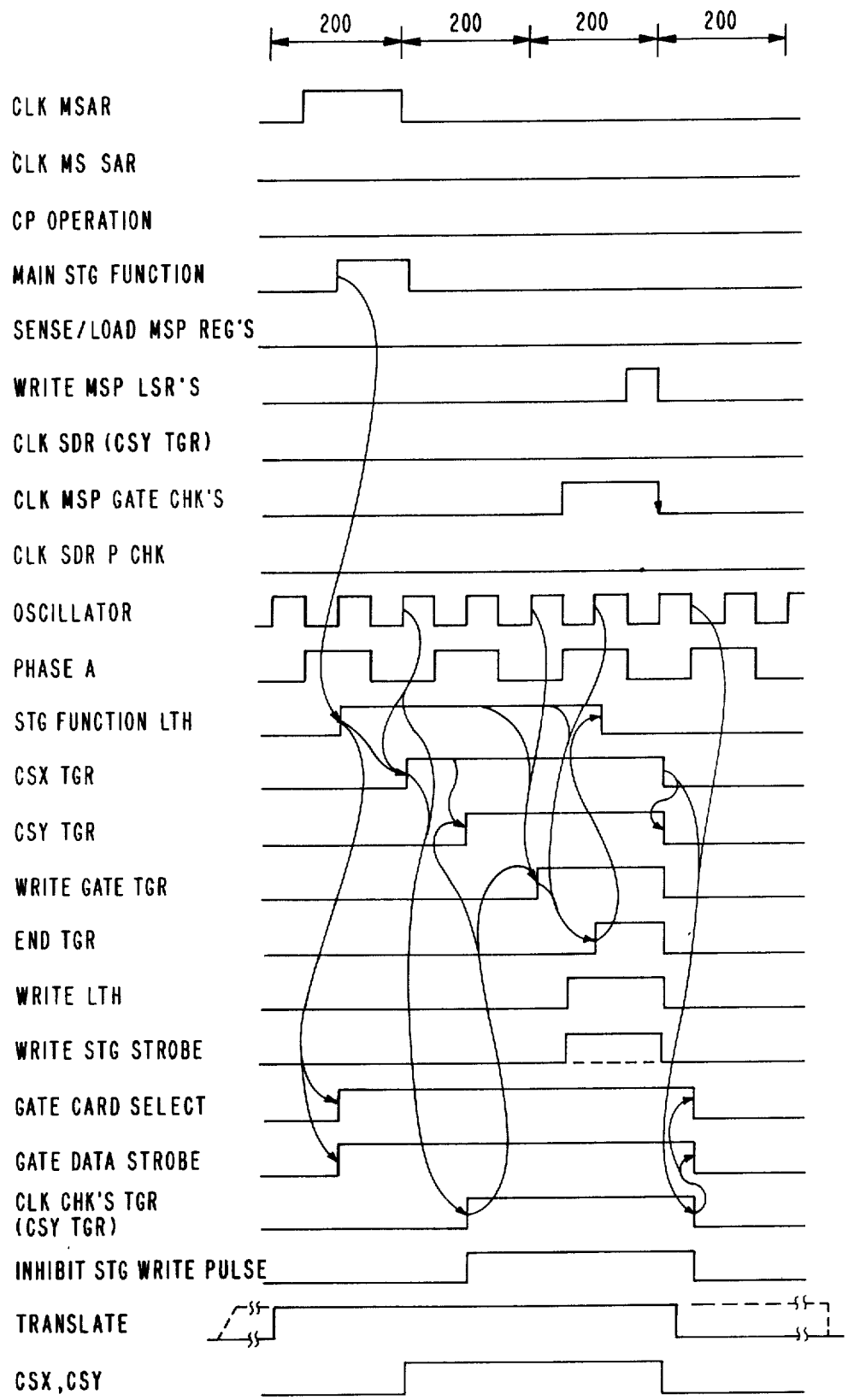
FIG. 12 is a timing diagram illustrating the timing signals involved during a main storage operation initiated by the MSP.
Figure 13:
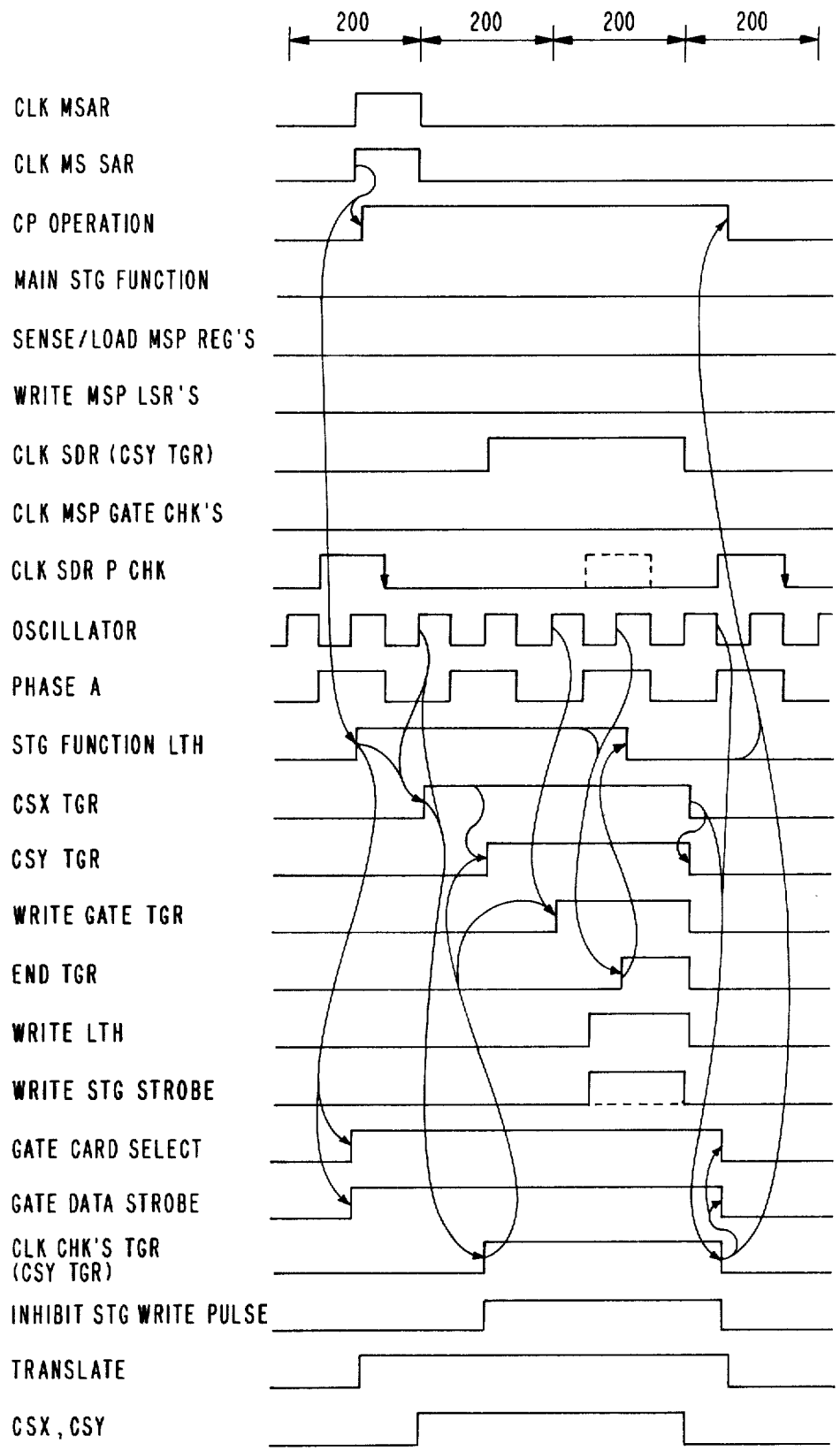
FIG. 13 is a timing diagram illustrating the timing signals involved during a main storage operation initiated by the CP; and, FIG. 14 is a timing diagram illustrating the timing signals involved during a register control instruction executed in the CP for loading or sensing MSP registers.

FIG. 12 is a timing diagram which illustrates the timings for a main storage operation initiated by the MSP 10. It is seen that the Inhibit Storage Write pulse comes up, if it is generated, well before the Write Storage Strobe signal. The timing diagram of FIG. 13 is similar to that of FIG. 12 except that the storage operation is initiated by the CP 300.

From the foregoing it is seen that storage protection is provided by merely loading any of the address translation registers 12 with hexidecimal FF. A valid storage address in MSAR 11 addresses one of the address translation registers 12 and upon the storage protect circuit 83 detecting the hexidecimal FF the storage operation is inhibited. It is also seen that fixed storage protection is provided by bit 7 in the program mode register 90 for both the translate and non-translate modes of operation. It is also seen that the Translate signal is automatically generated based upon interrupt level. It is further seen that the PMR 90 provides translation control for the main storage processor and the CMR 91 controls translation for the control processor. Further, it is seen that by having separate task and I/O translation registers contention for address translation registers is eliminated.

What is claimed is:

1. In a computer system including an addressable selectively operable storage, a central processing unit and I/O devices the improvement comprising
    an addressable register,
    a source of storage addresses for addressing storage and a special address distinguishable from said storage addresses for storage protection,
    means for selectively loading said addressable register with a storage address from said source of storage addresses when said loaded storage address is to address an unprotected storage location or with said special address for storage protection,
    means for generating an address translate control signal,
    addressing means for addressing said storage and for selectively addressing said addressable register,
    means selectively connectable under control of said address translate control signal to said addressable register for passing a storage address to said storage when said addressable register upon being addressed contains a storage address,
    means selectively connectable to said addressable register under control of said address translate control signal for generating a storage inhibit signal when said addressable register upon being addressed by said addressing means contains said special address instead of a storage address, and
    means for applying said storage inhibit signal to said storage.

2. The computer system of claim 1 further comprising first means operably controlled by said central processing unit during task operations for controlling selective operation of said addressing means to enable or disable addressing of said addressable register.

3. The computer system of claim 1 further comprising second means operably controlled by said central processing unit during I/O operations for controlling selective operation of said addressing means to enable or disable addressing of said addressable register.

4. The computer system of claim 1 wherein said special address consists of bits having a one state.

5. The computer system of claim 1 further comprising
    a second addressable register connected to be addressed by said addressing means and to be loaded with a storage address from said source of storage addresses or with said special address by said means for selectively loading said addressable register and selectively connectable under control of said address translate control signal to said means for generating said storage inhibit signal, and
    control means connected to control selective connection of said means for generating said storage inhibit signal when said addressable or second addressable registers are addressed by said addressing means.

6. The computer system of claim 5 wherein the selection made by said control means is determined by said central processing unit.

7. The computer system of claim 6 wherein said control means is caused by said central processing unit to select said addressable register for task operations and to select said second addressable register for I/O operations.

8. In a computer system having an addressable selectively operable storage, a storage address register, a source of storage addresses, means for loading storage addresses from said source of storage addresses into said storage address register the improvement comprising
    an addressable set of task translation registers,
    an addressable set of I/O translation registers,
    means for loading said task and I/O translation registers with first or second types of addresses, said first type of address being a translated address and said second type of address being a storage protection address,
    reading means for selectively reading addresses from said task and I/O translation registers,
    means responsive to said first addresses being read from said task or from said I/O translation registers for concatenating said read first addresses with the address from said address register to form an address for addressing storage, and
    means responsive to said second addresses being read from said task or from said I/O translation registers for inhibiting storage addressing.

9. In a computer system having an addressable selectively operable main storage containing main storage instructions and data, a first central processing unit connected to execute main storage instructions fetched from main storage, an addressable control storage containing control instructions, a second central processing unit connected to execute control instructions fetched from said control storage and connected to transfer data to and from said main storage, I/O devices connected for operation under control of said second central processing unit, the improvement comprising:
    a main storage address register,
    a source of main storage addresses,
    means for loading said main storage address register with addresses from said source of main storage addresses,
    a program mode register containing bit states for controlling main storage addressing intranslate and nontranslate modes,
    a control mode register containing bit states for controlling main storage addressing in translate and nontranslate modes,
    first means connected under control of said first central processing unit to said program mode register and responsive to bit states in said program mode register for selectively generating translate signals,
    second means connected under control of said second central processing unit to said control mode register and responsive to bit states in said control mode register for selectively generating translate signals,
    an addressable set of task translation registers connected for addressing under control of said main storage address register, said task translation registers being loaded with first or second types of addresses, said first type of address being a translated address and said second type of address being a storage protection address,
    an addressable set of I/O translation registers connected for addressing under control of said main storage address register, said I/O translation registers being loaded with said first or second types of addresses,
    main storage address decode means connected to receive addresses from said main storage address register and from said task or I/O translation registers depending upon whether a task or an I/O operation is in progress and for generating a main storage address from the address in said main storage address register in the absence of a translate signal from said first and second means or from the address in said main storage address register together with first types of addresses from said task translation registers for task operations or from said I/O translation registers for I/O operations in the presence of a translate signal from said first or second means, means responsive to second types of addresses from said task translation registers during task operations or from said I/O translation registers during I/O operations for generating main storage addressing inhibit signals, and means for applying said main storage addressing inhibit signals to said main storage address decode means to inhibit the addressing of said main storage.

10. The computer system of claim 9 wherein said I/O devices are connected to operate under control of said second central processing unit on interrupt levels and further comprising third means for generating translate signals in response to certain of said interrupt levels being active.

11. The computer system of claim 9 wherein the bits states of said program mode register and said control mode register are settable under control of said second central processing unit.

12. In a computer system including main storage with addressable location containing data and a central processing unit for retrieving data from, and storing data into, said addressable locations, the improvement comprising:

a source of storage addresses,
a storage address register,
means for loading addresses from said source of storage addresses into said storage address register,
a source of translated addresses,
a special address distinguishable from any of said translated addresses,
an address translate register addressable by said storage address register,
means for selectively loading said address translate register with one of said translated addresses for storage addressing or with said special address for storage protection,
address translate control means for selectively providing an address translate control signal,
storage protect means connected to said address translate register, and operative in response to receiving said address translate control signal for generating an inhibit storage signal when said address translate register contains said special address,
address decode means responsive to said address translate control signal and the absence of said inhibit storage signal for providing a discrete address to said storage by decoding an address from said storage address register and from said address translate register,
means for applying said address translate control signal to said storage protect and said address decode means, and
means for applying said inhibit storage signal to said address decode means.

* * * * *